United States Patent
Byun et al.

(10) Patent No.: US 7,511,920 B2
(45) Date of Patent: Mar. 31, 2009

(54) HARD DISK AND SPINDLE MOTOR ASSEMBLY

(75) Inventors: Yong-kyu Byun, Yongin-si (KR);
Min-pyo Hong, Suwon-si (KR);
Cheol-soon Kim, Anyang-si (KR);
No-yeol Park, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 411 days.

(21) Appl. No.: 11/494,464

(22) Filed: Jul. 28, 2006

(65) Prior Publication Data
US 2007/0047139 A1    Mar. 1, 2007

(30) Foreign Application Priority Data
Aug. 26, 2005    (KR)    ............ 10-2005-0078884

(51) Int. Cl.
*G11B 17/02*    (2006.01)
(52) U.S. Cl. ...................................... 360/99.12
(58) Field of Classification Search ............. 360/99.12, 360/135, 133; 720/720, 724
See application file for complete search history.

(56) References Cited

U.S. PATENT DOCUMENTS

| | | | | |
|---|---|---|---|---|
| 5,867,477 A | * | 2/1999 | Naito et al. | ............ 720/724 |
| 6,122,145 A | * | 9/2000 | Hoyle | ............ 360/133 |
| 6,304,417 B1 | * | 10/2001 | Bracken et al. | ............ 360/133 |
| 6,333,833 B1 | | 12/2001 | Bordes et al. | |
| 6,779,193 B2 | * | 8/2004 | Boissonneault et al. | ...... 720/720 |
| 2005/0270696 A1 | * | 12/2005 | Aioshi et al. | ............ 360/133 |
| 2007/0014046 A1 | * | 1/2007 | Kim | ............ 360/99.12 |

FOREIGN PATENT DOCUMENTS

| | | |
|---|---|---|
| JP | 2001-176236 | 6/2001 |
| JP | 2004-005978 | 1/2004 |
| JP | 2004241014 A  * | 8/2004 |
| JP | 2004-295962 | 10/2004 |
| KR | 1999-0029337 | 7/1999 |

\* cited by examiner

*Primary Examiner*—Tianjie Chen
(74) *Attorney, Agent, or Firm*—Volentine & Whitt, PLLC

(57) ABSTRACT

A spindle motor assembly includes a spindle motor having a shaft and a hub that rotates on the shaft, and a hard disk having a data storage medium mounted in the form of a whole disk, and a fastener attached to the center of a bottom surface of the disk-shaped data storage medium that faces the spindle motor. The fastener is a screw or a nut. In the case in which the fastener is a screw, a head of the screw is attached to the bottom surface of the hard disk, and the body of the screw is received in a screw hole in the upper portion of the shaft of the spindle motor. In the case in which the fastener is a nut, the nut is engaged with an external thread on an outer circumferential surface of the hub of the spindle motor.

8 Claims, 4 Drawing Sheets

HARD DISK AND SPINDLE MOTOR ASSEMBLY

BACKGROUND OF THE INVENTION

1. Field of the Invention

The present invention relates to a hard disk drive. More particularly, the present invention relates to a data storage hard disk and a spindle motor assembly for rotating a hard disk.

2. Description of the Related Art

A hard disk drive (HDD) is a device that stores and reproduces data on a data storage disk using a read/write head. The data storage hard disk is mounted on and rotated by a spindle motor, and to read/write data, the read/write head is moved by an actuator to the desired position above the recording surface of the rotating hard disk.

FIG. 1 is an exploded perspective view of a spindle motor assembly of a hard disk drive of the prior art, and FIG. 2 is a side view of the spindle motor assembly shown in FIG. 1. Referring to FIGS. 1 and 2, the spindle motor assembly of the prior art includes a data storage hard disk 20, a spindle motor 30 for rotating the data storage hard disk 20, a disk clamp 40, and a clamping screw 50. The spindle motor 30 is installed on a base of the hard disk drive and includes a shaft 32 and a hub 34 rotating about the shaft 32. The hard disk 20 has a hole 21 at its center and into which the hub 34 can be inserted, thereby allowing the hard disk 20 to be mounted on the hub 34 and rotated therewith. The disk clamp 40 is mounted on the spindle motor 30 to securely fix the hard disk 20 to the spindle motor 30. Specifically, the disk clamp 40 is fixed to the spindle motor 30 by the clamping screw 50. To this end, the disk clamp 40 has at its center a countersunk hole 41 into which the clamping screw 50 is inserted, and the shaft 32 of the spindle motor 30 has a threaded fastening hole 35. The clamping screw 50 is threaded into the screw fastening hole 35. Thus, the disk clamp 40 is resiliently deformed by the clamping screw 50, thereby pressing the disk 20 against and securely fixing the disk 20 to the hub 34 of the spindle motor 30.

As described above, in the prior art spindle motor assembly, the hard disk 20 needs the hole 21 at its center in order for the hard disk 20 to be mounted on the hub 34 of the spindle motor 30. However, the process for forming the hole 21 at the center of the hard disk 20 is not easy, and adds to the cost of manufacturing the spindle assembly and hence, the hard drive. In particular, the hard disk 20 is likely to be damaged when it is machined, i.e., when the hole 21 is formed, because the hard disk 20 is typically made of glass.

Also, in the conventional spindle motor assembly, the disk clamp 40 contacts the surface of the hard disk 20 to fix the hard disk to the spindle motor 30. The hard disk 20 may be warped because the force exerted by the disk clamp 40 on the hard disk 20 is not uniform in the circumferential direction of the hard disk.

Furthermore, in the conventional spindle motor assembly, the hard disk 20 and the disk clamp 40 are discrete members. Therefore, the hard disk 20 can slip to an eccentric position when shocks or vibration are applied to the spindle motor assembly while or after the hard disk 20 is assembled onto the spindle motor 30.

Finally, hard disk drives are increasingly being used in mobile electronics. Therefore, there is an increasing demand for miniaturized hard drives. The spindle motor assembly of the conventional motor spindle assembly shown in FIG. 2 having a 0.85 inch hard disk has an overall height H of about 4.11 mm. However, it is very difficult to miniaturize this spindle assembly, especially to reduce the height of the assembly, because of the disk clamp 40.

SUMMARY OF THE INVENTION

An object of the present invention is to provide a hard disk that is relatively simple to manufacture, and is not likely to be damaged by its manufacturing process.

Another object of the present invention is to provide a hard disk that has low manufacturing costs.

Another object of the present invention is to provide a data storage disk that will not be warped when it is attached to a spindle motor.

Another object of the present invention is to provide a spindle motor assembly that has low manufacturing costs and is easy to assemble Another object of the present invention is to provide a spindle motor assembly in which the hard disk and the spindle motor are securely attached to each other such that the hard disk will not move to an eccentric position with respect to the shaft of the spindle motor even when shock or vibration is applied to the spindle motor assembly.

Another object of the present invention is to provide a spindle motor assembly that is compact in the direction of its height.

According to an aspect of the present invention, there is provided a data storage hard disk including a data storage medium having the form of a whole disk such that no hole is present at the center of the data storage medium, and a fastener integral with the disk-shaped storage medium. The fastener is attached to and protrudes from the center of the bottom surface of the disk-shaped data storage medium.

According to another aspect of the present invention, there is provided a spindle motor assembly including a spindle motor having a shaft and a hub supported so as to be rotatable about the longitudinal axis of the shaft, and a hard disk fixed to the hub so as to rotate therewith, wherein the hard disk includes a data storage medium having the form of a whole disk such that no hole is present at the center of the data storage medium, and a fastener integral with the disk-shaped storage medium. The fastener is attached to and protrudes from the center of the bottom surface of the disk-shaped data storage medium that faces the spindle motor, and the fastener couples the disk-shaped data storage medium to the hub.

The fastener may be a screw. The head of the screw is attached to the bottom surface of the disk-shaped data storage medium. The body of the screw is received in the upper portion of the shaft of the spindle motor.

Alternatively, the fastener may be a nut. The internal thread of the nut may be engaged with an external thread formed on the hub of the spindle motor.

BRIEF DESCRIPTION OF THE DRAWINGS

The above and other objects, features and advantages of the present invention will become more apparent from the following detailed description of the preferred embodiments thereof made with reference to the attached drawings in which.

DETAILED DESCRIPTION OF THE PREFERRED EMBODIMENTS

A spindle motor assembly and a hard disk of the present invention will now be described more fully with reference to FIGS. 3-7. Note, like numbers designate like elements throughout the drawings.

Figure 1:
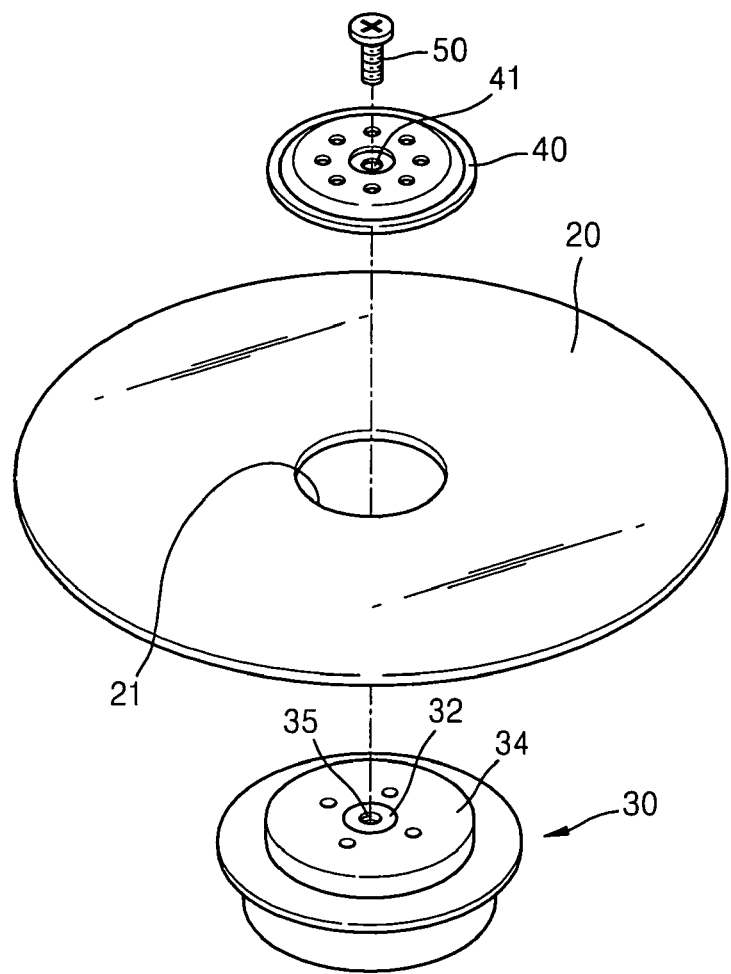
FIG. 1 is an exploded perspective view of a spindle motor assembly of a hard disk drive of the prior art.
Figure 2:
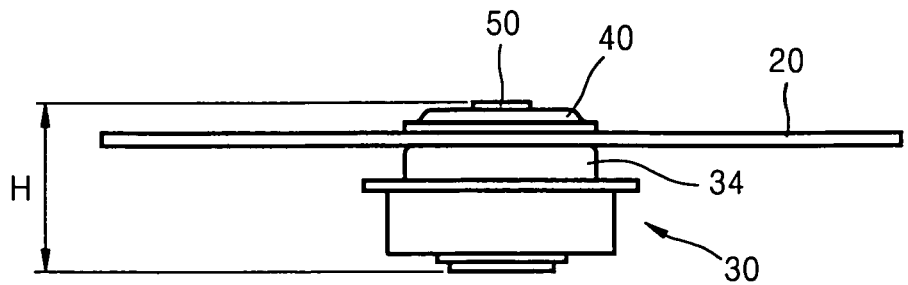
FIG. 2 is a side view of the conventional spindle motor assembly shown in FIG. 1.
Figure 3:
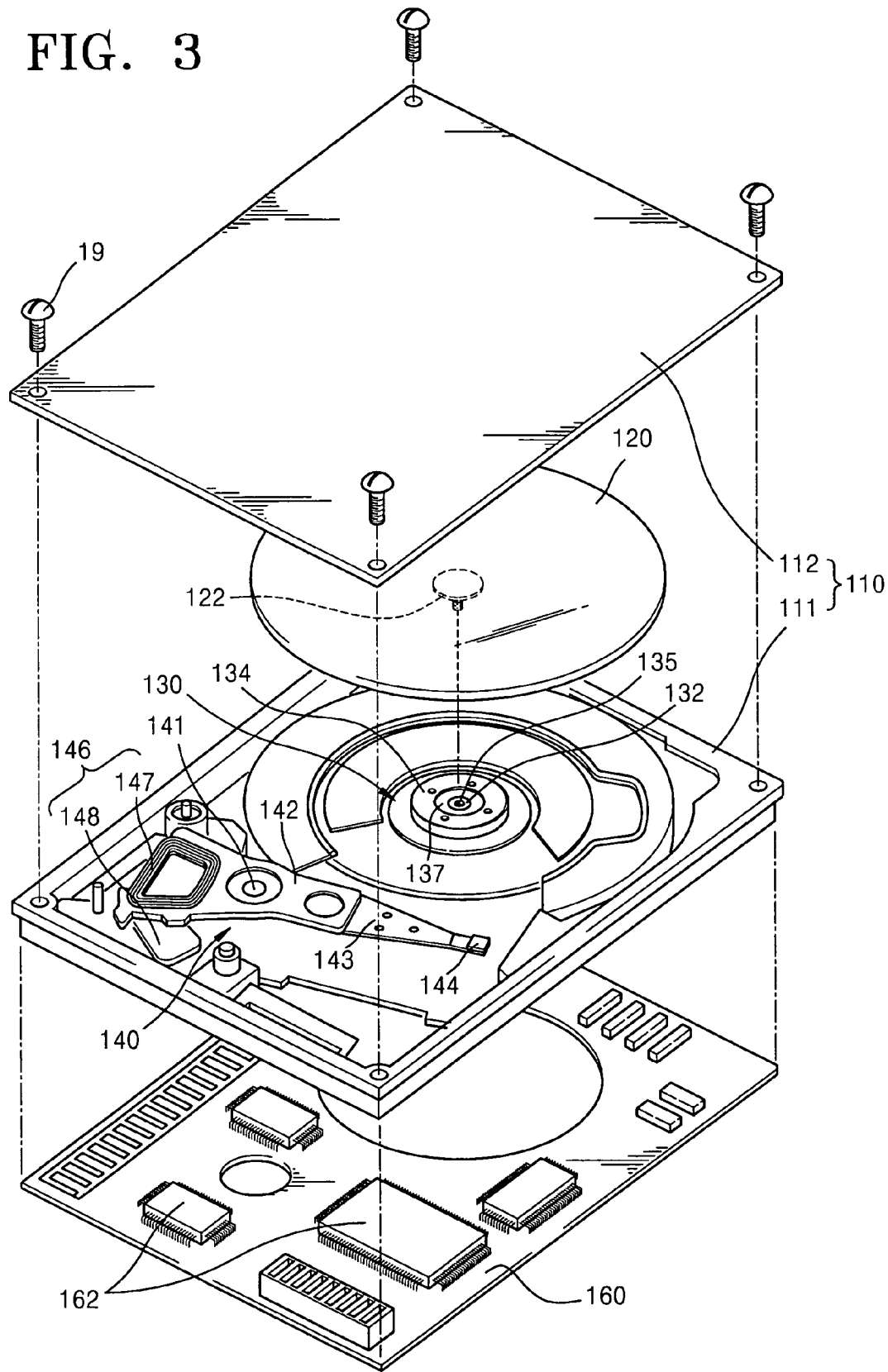
FIG. 3 is an exploded perspective view of an embodiment of a hard disk drive having a spindle motor assembly according to the present invention.

Referring first to FIG. 3, a hard disk drive includes a housing 110 consisting of a base 111 and a cover 112, a hard disk 120, i.e. a recording medium for storing data, a spindle motor 130 for rotating the hard disk 120, and an actuator 140 having a read/write head. The spindle motor 130 and the actuator 140 are disposed on the base 111. The cover 112 is coupled to the top of the base 111 by a plurality of fastening screws 19 and surrounds and protects the hard disk 120, the spindle motor 130, and the actuator 140. In addition, a printed circuit board 160 for operating the hard disk drive is attached to the bottom of the base 111. A plurality of electronic devices 162 are mounted on the printed circuit board 160.

The actuator 140 is rotatably supported by the base 111 so that the read/write head can be moved to a desired position above the hard disk 120 for reproducing or recording data. More specifically, the actuator 140 includes a swing arm 142 supported so as to be rotatable about the axis of a pivot 141 disposed on the base 111, a suspension 143 disposed at one end of the swing arm 142 to support a slider 144 such that the slider biases the head against the surface of the hard disk 120, and a voice coil motor (VCM) 146 for rotating the swing arm 142. The VCM 146 includes a VCM coil 147 coupled to the other end of the swing arm 142, and a magnet 148 disposed opposite the VCM coil 147.

The voice coil motor 146 is controlled by a servo control system so that the swing arm 142 is rotated according to Fleming's left-hand rule by an interaction between electric current input to the VCM coil 147 and a magnetic field of the magnet 148. When the hard disk drive is turned on and the hard disk 120 starts to rotate, the voice coil motor 146 moves the swing arm 142 to position the read/write head-mounted slider 144 above the data recording surface of the hard disk 120. The slider 144 is suspended slightly above the surface of the hard disk 120 by a force generated by the rotating hard disk 120, and in this state, the head mounted on the slider 144 reproduces or records data on the data recording surface of the hard disk 120. When the hard disk drive is switched off and the hard disk 120 stops rotating, the voice coil motor 146 moves the swing arm 142 in the opposite direction to move the slider 144 away from the data recording surface of the hard disk 120.

Figure 4:
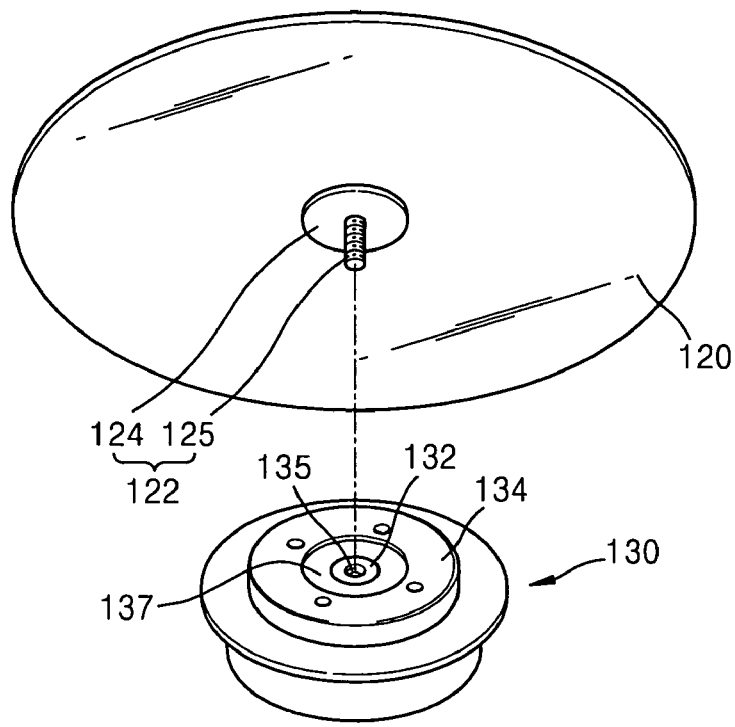
FIG. 4 is an exploded perspective view of the spindle motor assembly according to the present invention shown in FIG. 3.
Figure 5:
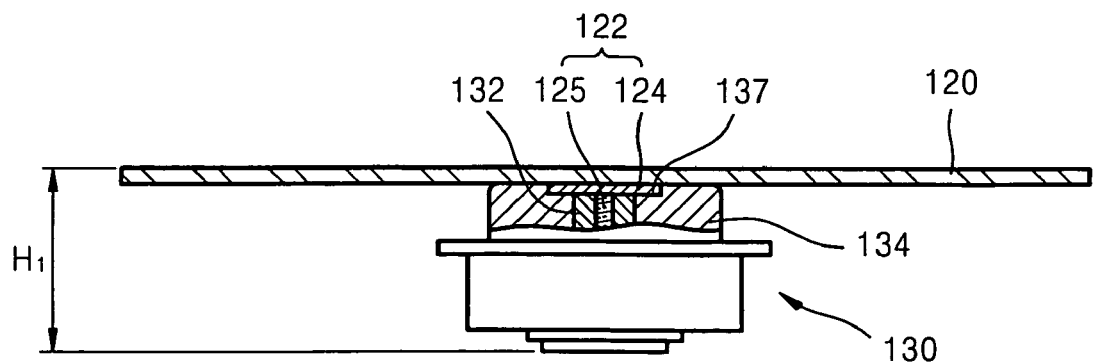
FIG. 5 is a side view, partially in section, of the spindle motor assembly according to the present invention shown in FIG. 3.

Referring to FIGS. 4 and 5, the spindle motor assembly according to the present invention includes the hard disk 120, and the spindle motor 130 for supporting and rotating the hard disk 120. However, as distinguished from the hard disk of the prior art spindle assembly, the hard disk 120 of the present invention does not have a hole at its center. Thus, the manufacturing process for the hard disk 120 is relatively simple. In addition, the form of the hard disk 120 is such that there is little risk of the hard disk being damaged during its manufacture.

In particular, the hard disk 120 includes a data storage disk, and a clamping screw 122 attached to the center of the bottom of the data storage disk, i.e., to the center of the surface that will face the spindle motor 130. The clamping screw 122 functions to fix the hard disk 120 to the spindle motor 130, and has a head portion 124 and a threaded portion 125. The head portion 124 of the clamping screw 122 is securely fixed to the bottom surface of the disk-shaped data storage medium by an adhesive.

The spindle motor 130 includes a shaft 132 and a hub 134 rotating about the central longitudinal axis of the shaft 132. A female thread 135 is formed in the upper portion of the spindle motor 130 to receive the threaded portion 125 of the clamping screw 122. The female thread 135 is preferably formed in the upper portion of the shaft 132 at the center of the spindle motor 130.

Thus, the hard disk 120 can be securely fixed to the spindle motor 130 by the clamping screw 122 that constitutes the bottom of the hard disk 120. Accordingly, the data storage disk is not prone to warping when it is fixed to the spindle motor 130. Also, the structure of the spindle motor assembly is simple and it is relatively easy to assemble the hard disk 120 and the spindle motor 130. Hence, the cost of manufacture of the spindle motor assembly is relatively low. Furthermore, the hard disk 120 will not move to an eccentric position on the shaft 132 of the spindle motor 130, even when shock or vibrations is/are applied to the spindle motor assembly, because the clamping screw 122 is an integral part of the hard disk 20. Also, the spindle motor assembly is relatively compact, i.e., the overall height H1 of the spindle motor assembly is relatively small.

To save space, the upper portion of the hub 134 of the spindle motor 130 preferably defines a groove 137 in which the head portion 124 of the clamping screw 122 is received. The depth of the groove 137 is preferably substantially the same as the thickness of the head portion 124 of the clamping screw 122. For example, for a spindle motor assembly according to the present invention employing a 0.85 inch hard disk, the overall height H1 of the assembly is about 3.6 mm, which is about 0.5 mm less than that of a prior spindle motor assembly invention employing a 0.85 inch hard disk. Furthermore, according to the present invention, the bottom of the hard disk 120 contacts the upper surface of the hub 134 over a wide area. Therefore, the hard disk 120 is held to the spindle motor 130 securely and stably.

Figure 6:
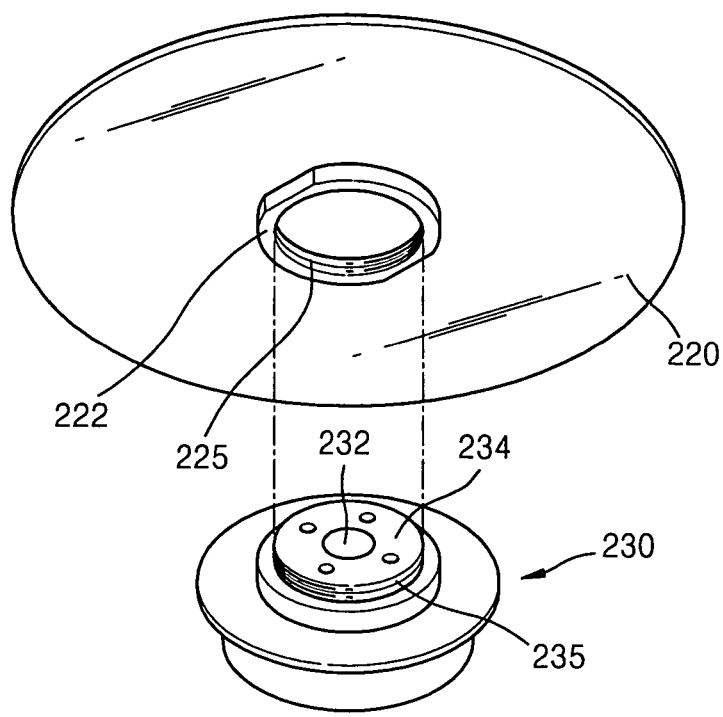
FIG. 6 is an exploded perspective view of another embodiment of a spindle motor assembly according to the present invention.
Figure 7:
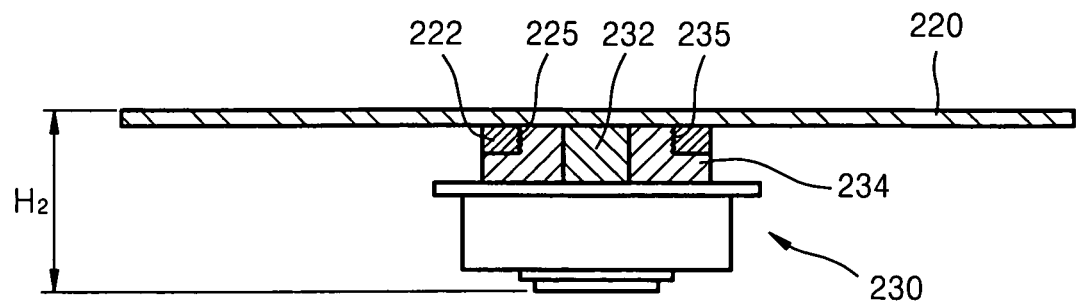
FIG. 7 is a side view, partially in section, of the spindle motor assembly according to the present invention shown in FIG. 6.

Referring next to FIGS. 6 and 7, another embodiment of a hard disk 220 according to the present invention includes a data storage disk and a nut 222 attached to the center of the bottom of the data storage disk. Preferably, the clamping nut 222 is fixed to the bottom of the data storage disk by an adhesive.

The spindle motor assembly includes the hard disk 220 and a spindle motor 230 to which the hard disk 220 is connected. The spindle motor 230 includes a spindle motor 230 having a shaft 232 and a hub 234 rotating about the longitudinal axis of the shaft 232. The hub 234 has a male threaded portion 235. More specifically, the hub 234 has a thread on the outer circumferential surface the end thereof remote from the spindle motor 230. The male threaded portion 235 is received in and engaged with the thread 225 on the inner circumferential surface of the nut 222. Thus, the hard disk 220 is securely fixed to the spindle motor 230. Accordingly, the embodiment of FIGS. 6 and 7 has all of the advantages described above in connection with the embodiment of FIGS. 4 and 5.

That is, as described before, the hard disk according to the present invention comprises a data storage medium having the form of a whole disk, i.e., a data storage disk which does not have any hole at its center. Thus, the hard disk is relatively simple to manufacture, and is not likely to be damaged by its manufacturing process.

Furthermore, the hard disk is fixed to a spindle motor using a member, e.g., a screw or a nut, attached to the bottom of the data storage disk. Thus, the costs associated with manufacturing and assembling the components of the spindle motor assembly are relatively low. In addition, the member that fixes the hard disk to the spindle motor allows the force of the spindle motor exerted on the hard disk to be distributed uniformly over a relatively wide area of the data storage disk. Therefore, the data storage disk will not be warped by the force holding it to the spindle motor, thereby ensuring accuracy in the reading and/or writing of data.

Also, in the spindle motor assembly of the present invention, the hard disk and the spindle motor are securely attached to each other so that the hard disk will not be moved to an eccentric position with respect to the shaft of the spindle motor even when shock or vibration is applied to the spindle motor assembly during or after the hard disk and the spindle motor are assembled.

Also, the overall height of the spindle motor assembly is minimal. Therefore, the spindle motor assembly according to the present invention is useful in the hard disk drive of miniature electronic devices, especially mobile electronic devices.

Finally, although the present invention has been particularly shown and described with reference to the preferred embodiments thereof, the present invention is not so limited. Rather, various changes in form and detail may be made to the preferred embodiments without departing from the true spirit and scope of the present invention as defined by the following claims.

What is claimed is:

1. A data storage hard disk, comprising:
    a data storage medium having the form of a whole disk such that no hole is present at the center of the data storage medium, and a fastener integral with the disk-shaped storage medium, the fastener attached to and protruding from the center of the bottom surface of the disk-shaped data storage medium.

2. The hard disk according to claim 1, wherein the fastener is a screw having a head and a threaded body extending from the head, wherein the head is attached to the bottom surface of the disk-shaped data storage medium.

3. The hard disk according to claim 1, wherein the fastener is a nut having an internal thread.

4. A spindle motor assembly of a hard disk drive, comprising:
    a spindle motor having a shaft and a hub supported so as to be rotatable about the longitudinal axis of the shaft; and
    a hard disk fixed to the hub so as to rotate therewith, the hard disk comprising a data storage medium having the form of a whole disk such that no hole is present at the center of the data storage medium, and a fastener integral with the disk-shaped storage medium, the fastener attached to and protruding from the center of the bottom surface of the disk-shaped data storage medium that faces the spindle motor, and the fastener coupling the data storage medium to the hub.

5. The spindle motor assembly according to claim 4, wherein the fastener of the hard disk is a screw having a head and a threaded body extending from the head, the head is attached to the bottom surface of the disk-shaped data storage medium, the shaft of the spindle motor has an internal thread in an upper portion thereof, and the threaded body of the screw is engaged with the internal thread of the shaft.

6. The spindle motor assembly according to claim 5, wherein the upper portion of the hub of the spindle motor has a groove, and the head of the screw of the hard disk is received in the groove.

7. The spindle motor assembly according to claim 6, wherein the thickness of the head of the screw is substantially the same as the depth of the groove.

8. The spindle motor assembly according to claim 4, wherein the fastener of the hard disk is a nut attached to the bottom surface of the disk-shaped data storage medium, the hub of the spindle motor has a thread on an outer circumferential surface thereof, and the internal thread of the nut is engaged with the external thread of the hub.

* * * * *